(12) United States Patent
Nappi

(10) Patent No.: US 12,127,702 B2
(45) Date of Patent: Oct. 29, 2024

(54) TEMPERATURE REGULATED PREPARATION AND STORAGE SYSTEM

(71) Applicant: Eat Figo, LLC, Fort Lauderdale, FL (US)

(72) Inventor: Robert Nappi, New York, NY (US)

(*) Notice: Subject to any disclaimer, the term of this patent is extended or adjusted under 35 U.S.C. 154(b) by 0 days.

(21) Appl. No.: 18/100,557

(22) Filed: Jan. 23, 2023

(65) Prior Publication Data

US 2023/0157475 A1 May 25, 2023

Related U.S. Application Data

(62) Division of application No. 16/862,560, filed on Apr. 29, 2020, now Pat. No. 11,559,161.

(60) Provisional application No. 62/840,386, filed on Apr. 29, 2019.

(51) Int. Cl.
| | |
|---|---|
| A47J 27/10 | (2006.01) |
| A23L 5/10 | (2016.01) |
| A47J 27/00 | (2006.01) |
| A47J 36/32 | (2006.01) |
| F25B 21/04 | (2006.01) |
| H05B 3/68 | (2006.01) |

(52) U.S. Cl.
CPC .............. *A47J 27/10* (2013.01); *A23L 5/13* (2016.08); *A47J 27/004* (2013.01); *A47J 36/321* (2018.08); *F25B 21/04* (2013.01); *H05B 3/68* (2013.01); *A23V 2002/00* (2013.01)

(58) Field of Classification Search
CPC  A23L 5/13; A47J 36/321; A47J 27/10; H05B 3/68
See application file for complete search history.

(56) References Cited

U.S. PATENT DOCUMENTS

2017/0135383 A1* 5/2017 Liss ............... A47J 27/002

* cited by examiner

*Primary Examiner* — Thien S Tran
(74) *Attorney, Agent, or Firm* — Diana Mederos; Mederos Legal, PLLC

(57) ABSTRACT

A temperature-regulated apparatus for food and drink preparation and storage, particularly for refrigeration and sous vide cooking. The apparatus is preferably a consumer electronic device comprising a compartment, base, reservoir, tube network, heating and cooling element, and an air pump system. The apparatus is controlled electronically and wirelessly in connection with a hardware and software system.

2 Claims, 17 Drawing Sheets

Fig. 16A
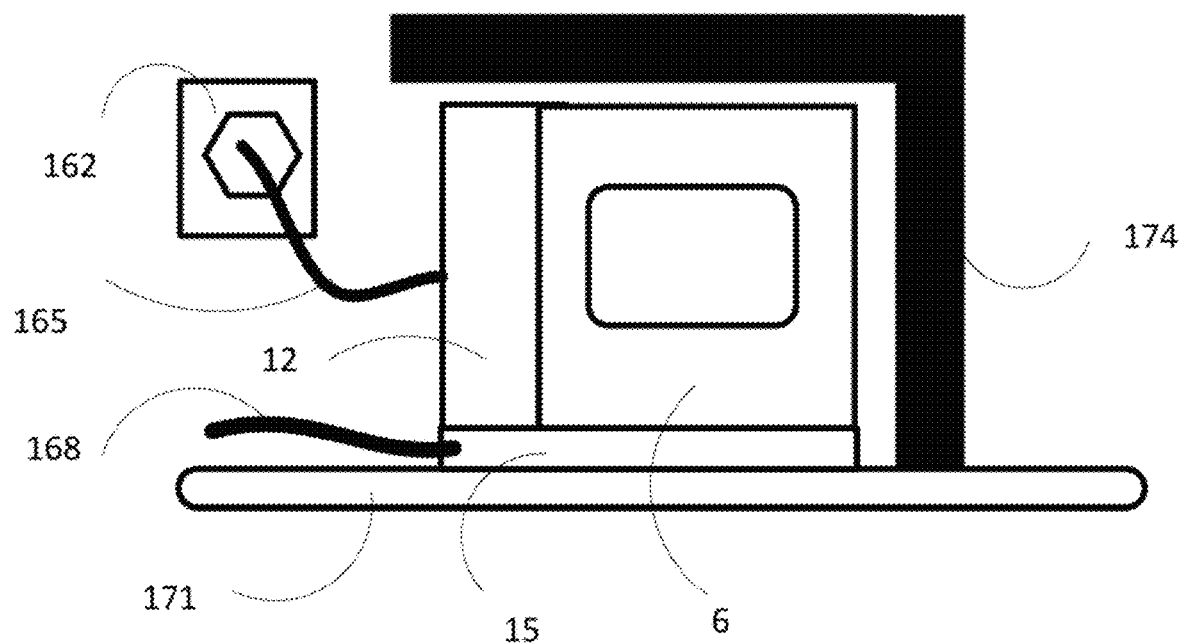
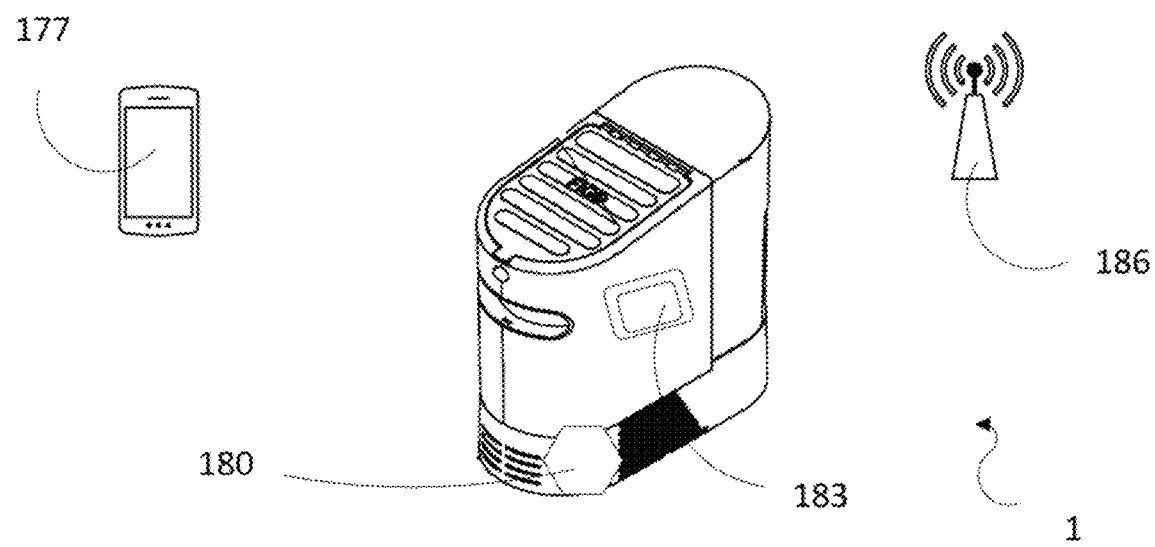
Fig. 16B

TEMPERATURE REGULATED PREPARATION AND STORAGE SYSTEM

CROSS REFERENCE TO RELATED APPLICATION

This application is a divisional application of non-provisional application Ser. No. 16/862,560 filed Apr. 29, 2020, which claims the benefit of United States provisional application entitled Temperature Regulated Preparation and Storage System and having application No. 62/840,386 filed on Apr. 29, 2019. The entire contents are incorporated by reference herein.

FIELD OF THE DISCLOSURE

The present disclosure pertains to methods and apparatuses for a temperature regulated preparation and storage system. More specifically, the present disclosure presents a consumer device for sous vide cooking with heating and cooling elements used for cooking, heating, and cooling food and drink.

BACKGROUND OF THE DISCLOSURE

Sous vide cooking systems and devices have become a popular method of preparing and cooking vacuum sealed food within the United States. These sous vide cooking methods have traditionally used a cooking pot on a stove top which cooks a selected vacuum sealed food to a specific temperature using an inserted circulation mechanism. The resultant process is intended to produce an evenly cooked product prepared at a very specific temperature within its natural juices. Sous vide cooking methods are especially useful for cooking delicate ingredients such as seafood.

Generally, sous vide cooking involved placing food in a vacuum-sealed plastic vessel and placing the vessel in a water bath. The vacuum-sealed vessel is preferably completely submerged in the water bath to provide for even cooking while reducing water loss. For example, a salmon filet with seasoning can be placed in a vacuum sealed vessel, placed in the sous vide water bath and cooked to the desired temperature while remaining tender.

Sous vide cooking apparatuses provide cooking advantages but require careful monitoring by someone familiar with the cooking requirements for each type of food being cooked. Parameters such as temperature and time will vary depending on the food type.

Currently, there are a variety of sous vide devices which use the above-mentioned technology. However, most of these designs are difficult to use, and the cooking methods are complicated. Further, these devices are not configured to be stored on a countertop, built in to cabinets, or placed on the floor or other surface.

Current devices are not easily accessible and require multiple parts to be assembled each time the device is used. Further, these devices merely allow the user to cook a vacuum-sealed food to a precise temperature and do not provide any means of storage or refrigeration.

Traditional sous vide apparatuses either have only a single chamber that performs one function—cooking or heating—or have multiple chambers for different purposes. In multi-chambered apparatuses, a person must move the vacuum-sealed vessel from one chamber to the next. Some apparatuses have a cooking chamber and a storage chamber where the food in the vacuum sealed vessel can rest after cooking.

Sous vide apparatuses also cannot be used like slow cookers. With slow cookers, a person places the ingredients in the slow cooking pot and sets the cooking temperature and/or time in the morning before leaving for work. When the person comes home in the evening, the ingredients in the slow cooker will be cooked and kept warm. Slow cookers also are not typically recommended for use with delicate ingredients such as seafood like fish filets, scallops, shrimp, crab legs, and lobster tails because such delicate ingredients will be overcooked. If the slow cooker heat is turned off once the ingredients have been cooked, then the food sits at room temperature for several hours, increasing the chances of bacterial and fungal overgrowth.

Similarly, a person cannot place a vacuum sealed vessel containing food in a sous vide apparatus in the morning and come home to a read-to-eat meal because the food and ingredients in the vacuum-sealed vessel will either be overcooked if cooked all day or will have increased bacterial and/or fungal growth if left at room temperature for several hours. Furthermore, delicate food will spoil, and food will be wasted.

SUMMARY OF THE DISCLOSURE

What is needed are methods and apparatuses for temperature regulated preparation and storage system as described herein. The apparatus comprises a base that accommodates a reservoir and a compartment. The base houses functional components such as a heating and cooling elements. A tube network spans the reservoir and the compartment. Liquid flows between the reservoir and the compartment.

A pump system is used to pressurize or create a vacuum in the compartment. The pressure or vacuum induces the movement of liquid to and from the reservoir and to and from the compartment. Exemplary embodiments include pump systems that utilize a single air pump in the compartment, a water pump in the reservoir and a water pump in the compartment, and an external water line with switch configuration.

Valves, indicator lines, and sensors regulate the liquid levels and liquid temperature.

Sous vide cooking takes place in the compartment. In preferred embodiments, ingredients are placed in a vacuum-sealed vessel which is then placed in the compartment. The air pump or an internal air fan and the cooling element provide refrigeration inside the compartment. The air pump and the heating element provide cooking inside the compartment. Refrigeration is done by dry cooling the compartment interior space. Cooking is done by heating the liquid flowing in the compartment.

The apparatus is either free standing or built in. The apparatus is powered electronically. The apparatus can also be connected directly to a water line. The apparatus can also have a vacuum outlet module, eliminating the need for additional machines to vacuum seal a vessel.

The apparatus is controlled directly via a control panel on the apparatus or remotely via a smart device and wireless data connection.

A person uses the apparatus by introducing a vacuum-sealed vessel with ingredients into an empty compartment. The compartment is filled with water or liquid via a pump system and heated via a heating element. The ingredients in the vessel are cooked according to pre-defined parameters. The compartment can be refrigerated via a cooling element producing dry cooling before and after cooking. Liquid is removed from the compartment, initiated by the pump system moving liquid through a tube network out of the compartment.

BRIEF DESCRIPTION OF THE DRAWINGS

The accompanying drawings that are incorporated in and constitute a part of this specification illustrate several embodiments of the disclosure. Together with the description, the drawings serve to explain the principles of the disclosure.

FIG. 16A shows an exemplary apparatus in a built-in setting.

FIG. 16B shows an exemplary apparatus with wireless connectivity.

REFERENCE NUMERALS OF THE DRAWINGS

Figure 1:
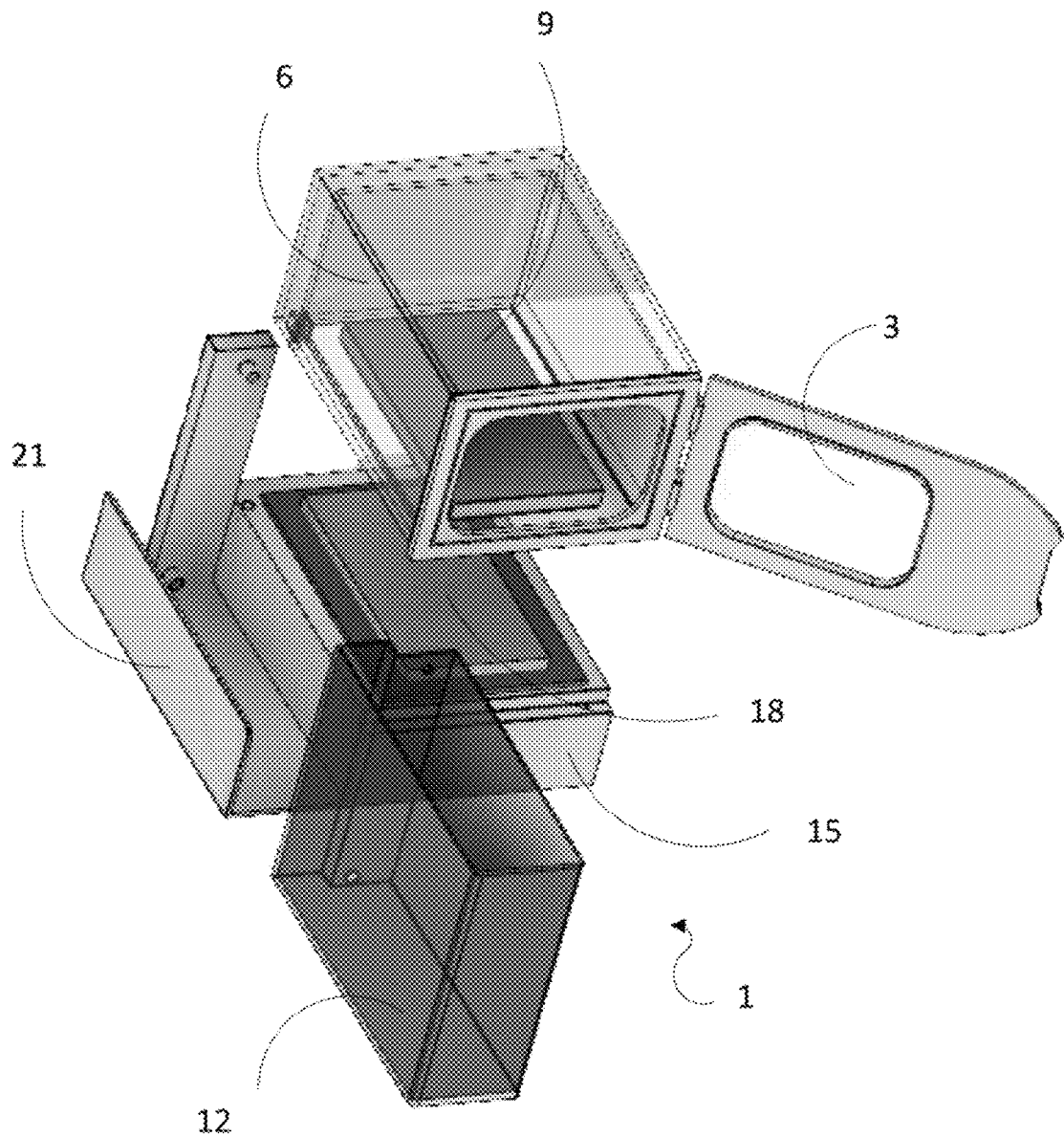
FIG. 1 shows an exploded view of an exemplary apparatus with a front-load configuration.

1. Apparatus
3. Door
6. Compartment
9. Compartment interior space
12. Reservoir
15. Base
18. Heating and cooling element compartment
21. Housing
24. Air outlet
27. Air inlet
30. Lid
33. Front side
36. Rear side
39. Lid latch
42. Left side
45. Right side
48. Max fill indicator
51. Compartment release
54. Window
57. Compartment connector
60. Air tube
63. Water tube
66. Heating element
69. Cooling element
72. Reservoir entrance
75. Reservoir dock
78. Compartment dock
81. Water inlet/outlet
84. Lid hinge
87. Temperature sensor
90. Air inlet/outlet
93. Insulation
96. Outer wall
99. Inner wall
102. Spacer
105. Heat sink
106. Fan
108. Cold sink
109. Water tube
111. Fan
114. Water tube
117. Valve
120. Check valve
123. Fill line
126. Overflow safety
129. Rim
132. Compartment water connector
135. Reservoir water connector
138. Water level line
141. Air pump
144. Vessel
147. Ingredient
150. Vacuum-sealed vessel
153. Cooling
156. Heating
159. Liquid
162. Power source
165. Wire
168. External water line
171. Countertop
174. Cabinet
177. Smart device
180. Vacuum outlet module
183. Control panel
186. Wireless network
189. Water line
192 reservoir water pump
195. Compartment water pump
198. Compartment outlet
201. Reservoir outlet
204. Y valve
207. Drain switch
210. Drain line output
213. Water line input

DETAILED DESCRIPTION

The present disclosure provides generally for a sous vide cooking apparatus, its exemplary embodiments, and methods of use. The exemplary configurations describe a sous vide apparatus with more efficient heating, one that offers refrigeration, one that is easy to use, and one that has less components that may break. The apparatus allows for programed cooking based on parameters such as ingredient type, level of cooking desired, time, and temperature. The apparatus offers the ability for hands-free delayed cooking without spoiling the ingredients over an extended period of time. The apparatus implements air movement parameters via a single air pump to move liquid and a peltier for dry cooling. Therefore, temperature levels of refrigeration can be achieved. Resistive heating from a heating element provides enough heat to cook ingredients such as vegetables, seafood, and steak. The apparatus can be built in but is also small and light enough to be placed on a countertop and be portable.

The apparatus comprises a compartment and a reservoir docked to a base. The base comprises heating and cooling elements. A tube network regulated by valves, line checks, and connectors, provides a portal to and from the reservoir and to and from the compartment. The tube network comprises water tubes for moving water and air tubes for moving air. One compartment is filled while the other is empties via the tubes. No water pump is involved in this particular configuration. Instead, liquid is moved due to an air pump in the compartment. Water fill is regulated by an overfill safety and a water line.

In alternative configuration, in lieu of a single air pump system, a dual water pump system, or a pumpless switch system can be implemented. In the dual water pump system, the reservoir and the compartment each have its own water pump to move water through the tube network and between the reservoir and the compartment.

In an alternative configuration, the apparatus reservoir and pumps are absent. Instead, the apparatus contains a single chamber, a compartment that has a drain switch with a Y valve for a drain line and a water input line. Gravity pulls the water down the drain line. Pressure and flow from the water line input fill the compartment.

The air pump in the compartment will create a vacuum to draw liquid from the reservoir, through the tubes, past a valve, and through a compartment connector into the compartment. The same air pump will pressurize the compartment to push liquid through the compartment connector, into the tubes, through a valve, and into the reservoir. Filling is regulated by a water line.

Heating and cooling are accomplished by thermoelectric power. A peltier, heat sink, and fan are implemented in a heating and cooling element compartment. The apparatus is capable of refrigerating ingredients in a vacuum-sealed vessel in the dry compartment before initiating filling the compartment with liquid, heating the liquid, and cooking the ingredients. The compartment can then be pressurized via the air pump, emptying to the reservoir. A subsequent refrigeration cycle may commence, or the cooked ingredients in the vacuum-sealed vessel may be retrieved.

DETAILED DESCRIPTIONS OF THE DRAWINGS

Referring now to FIG. 1, an exploded view of an exemplary apparatus in a front-loading configuration is shown. An exemplary apparatus comprises a base, a reservoir, a compartment, a platform, and a door. The reservoir is configured to hold a liquid. The liquid may be a coolant such as water. Additional compounds may be added to the water or other liquid used to improve cooling. The apparatus has an integrated heating and cooling element. In preferred embodiments, the cooling system is a thermoelectric system.

Contents such as but not limited to food and drink are placed in the compartment. A user opens the door and places the contents on the platform. The door may open vertically or horizontally and may be positioned on the side or on the top of the apparatus. In some embodiments, there may be more than one door. The base may be constructed from metal, ceramic, porcelain, and combinations thereof. Below the container platform is the thermoelectric system for heating and cooling in the base. The reservoir provides liquid to be pumped from the reservoir and circulated into compartment and then the base in a closed tube system. Various pumps may be used. In some embodiments, the reservoir may be removable and may lock into the base. In other embodiments, the reservoir may be fixedly attached to the base.

In an exemplary thermoelectric system, a thermoelectric device is cooled by using at least one copper water heat sink. Liquid is pumped from the reservoir to the compartment and to the heat sink where the heat in the heat sink is thermodynamically transferred to the cooler liquid. The liquid is heated as a result. Substantially concurrently, the heated liquid may be recycled for preheating and cooking, and the compartment, especially the platform, containing the food or drink is cooled because the heat is transferred from the platform to the heatsink to the liquid. Liquid is moved by an air pump that creates pressure or a vacuum in a substantially air- and watertight system between the reservoir and the compartment. Water enters the compartment from the reservoir and then drains back to the reservoir A heating element works in connection with a thermally conductive material such as aluminum. An apparatus may comprise various materials with varying thermal conductivity. For example, the platform may comprise an aluminum alloy with high thermal conductivity, and the compartment interior walls may comprise an aluminum alloy with a lower thermal conductivity.

Figure 2:
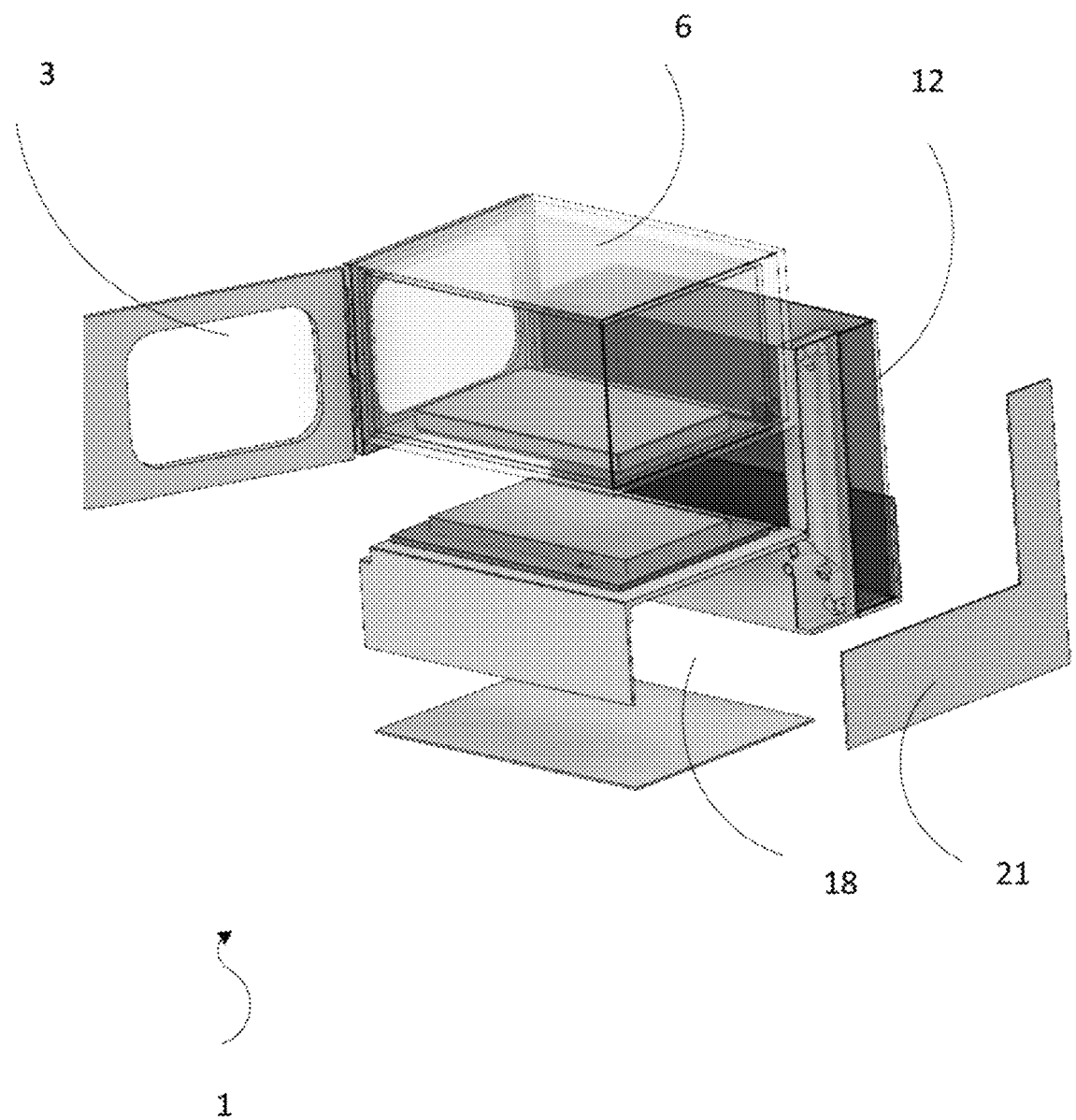
FIG. 2 shows an alternative exploded view of an exemplary apparatus with a front load configuration.

Referring now to FIG. 2, an alternative view of an exemplary apparatus in a front-loading configuration is shown. Inside the base and under the compartment, the heating and cooling elements are contained. The heating element preferably is present below or at the platform. In some embodiments, the platform is the heating element. In the center of the heating element is at least one thermoelectric cooler attached to at least one copper heatsink. The heating element may be present about the perimeter of the platform. For example, the heating element may have a round or square shape and open in the center where the thermoelectric cooler and heatsinks are placed. The heatsinks may have a liquid cooling block and may be connected to the tube or hose system which are further connected to the reservoir. The reservoir has at least one output terminal and at least one input terminal to which hoses or tubes are attached for circulating the liquid between the reservoir and the compartment.

A pump system may comprise a water pump, air pump, and air solenoids. Preferably, the water reservoir is placed on the side of the base of the apparatus, liquid is pushed down from the pressure generated by a pump. A tube is preferably above the liquid line in the reservoir. When the pressurized air is generated from an air pump and into the reservoir, the liquid is forced through the tube and into the compartment. The air pump may have at least one three-way switch to control the direction of the air pressure in either the reservoir or into the compartment.

The apparatus may comprise at least one power supply unit or an external power source. All of the electric components are connected to a motherboard comprising a processor, wireless receivers, sensors, and memory. Software may be stored in a tangible medium with commands executed by a processor.

As a result of the exemplary configuration, food and drink or any other item in the compartment may be heated and cooled, eliminating the need for two appliances. A further unique aspect of the apparatus is that it can refrigerate the compartment to preserve ingredients until the desired time to begin cooking. This prevents spoilage and overcooking, especially with delicate ingredients such as seafood.

The apparatus may be operated or controlled via an on-device control panel or via a wireless device such as a smart phone, watch, or tablet. The apparatus may be integrated with smart home management systems with voice command capabilities. In preferred embodiments, once the apparatus is connected to an Internet connection and synchronized with a smart device application, the apparatus is ready for use. In preferred embodiments, food or drink should be packaged in a vacuum-sealed vessel such as a plastic or silicone container and is then loaded into the compartment. The container should permit efficient transfer of heat from the compartment to the food or drink. Once the door is closed, heated water is pumped into and circulates through the compartment.

The software commands executed by the hardware components allow for users to select pre-programmed instructions for heating or cooking various food and drink. The system may work in connection with temperature, weight, and density sensors for adjusting cooking, heating, and cooling duration. Users may use software commands from a mobile application to select parameters such as cooking time, whether slow or fast cooking is desired, and the type of food or drink.

In some embodiments, the apparatus may be constructed from high durometer plastic or thermoplastic casing. However, any high durometer material may be used as long as it provides adequate insulation to the contained fluid. Located along a front side portion of each of the plurality of contained compartment is access door which allows the user to insert and removed a vacuumed sealed food.

The hermetically sealed housing unit includes a square-shaped configuration with a height defined as the distance between a first end and the second end. A top portion of the housing may be dimensioned to include a control panel display or liquid crystal display which enables the user to input at least a pre-selected cook time. The display includes a hermetically sealed seam which prevents any water intrusion to the interior components of the display and microprocessor. The interior portion of the housing element includes the plurality of contained compartments which are equilateral shaped and laterally spaced apart to ensure proper insulation to each of the plurality of contained compartments. Further included between each of the plurality of contained compartment includes at least one fluid connection between each of the plurality of contained compartments and the thermoelectric cooling pad or element.

The apparatus is provided electrical power from a conventional source of electrical power. The microprocessor is electrically connected to the display and configured to transmit a signal from the internal memory module to the display when a user input is entered. The display unit further includes a power button, time selector, water level indicator received from affixed transmitter which each of the plurality of contained compartments. Further controlled at the display unit is the circulation means including an impeller electrically connected to motor and pump. Though it is contemplated that the housing unit square-shaped and dimensioned to fit on a countertop, on the floor, built in to cabinets, or on any surface, it could be designed in a variety of shapes.

The apparatus is configured to heat to a pre-selected temperature once inputted within the display unit. The water in each of the plurality of contained compartments is heated as it passes through the thermoelectrical pad or electrical resistance heater contained in the recess between each of the plurality of contained compartments. The heated water is then circulated within the contained compartment until the desired internal temperature of the ingredient or contained food item is achieved. When cooled, the water may be removed from the selected contained compartment by first selecting the compartment and then selecting "cool" to drain the contained water level using the impeller.

Figure 3:
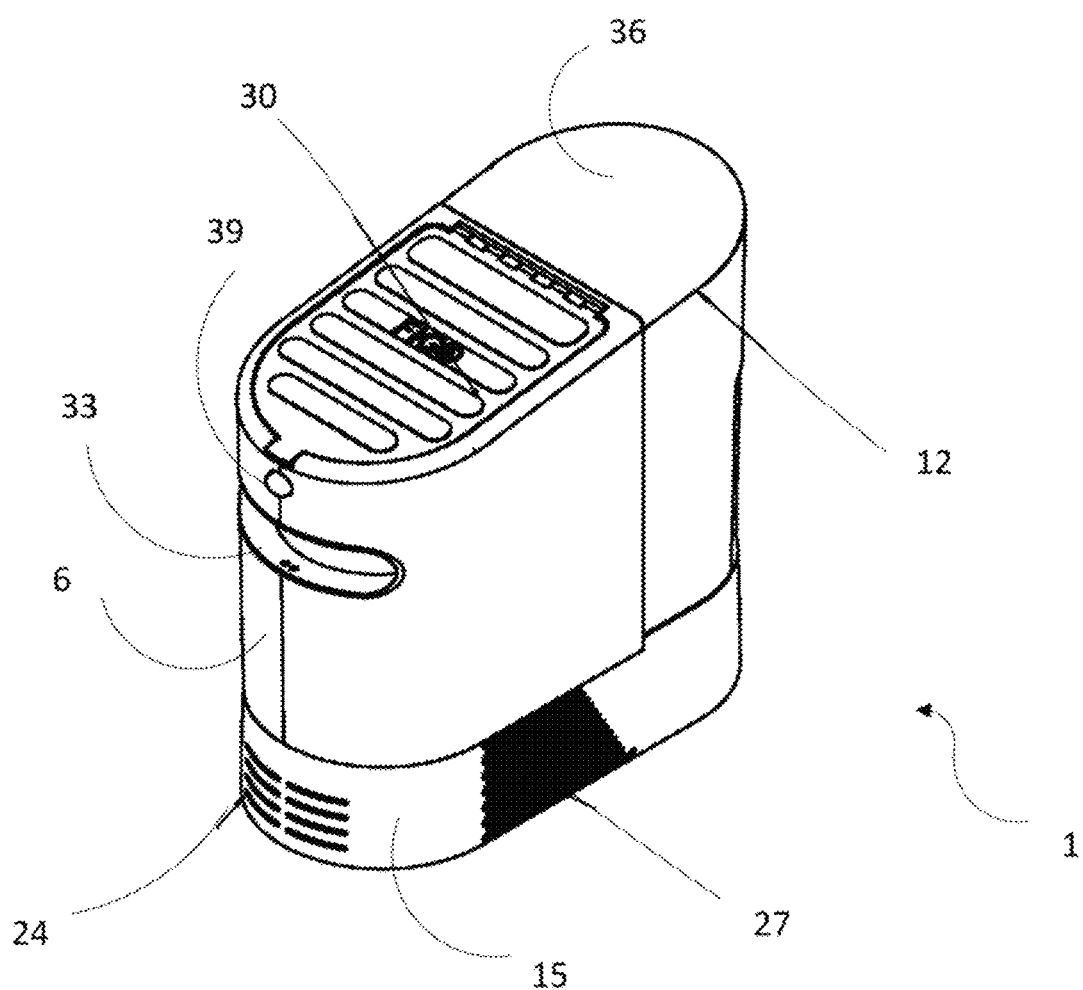
FIG. 3 shows a perspective view of an exemplary apparatus with a top load configuration.

Referring now to FIG. 3, a perspective view of an exemplary apparatus with a top load configuration is shown. The apparatus is presented with a base that accommodates a reservoir and a compartment. The base contains an air inlet and an air outlet. The compartment has a lid that is secured or released with a lid latch. The compartment is at a front side of the apparatus, and the reservoir is at a rear side of the apparatus. Nevertheless, apparatuses with multiple reservoirs or multiple compartments are contemplated.

Figure 4:
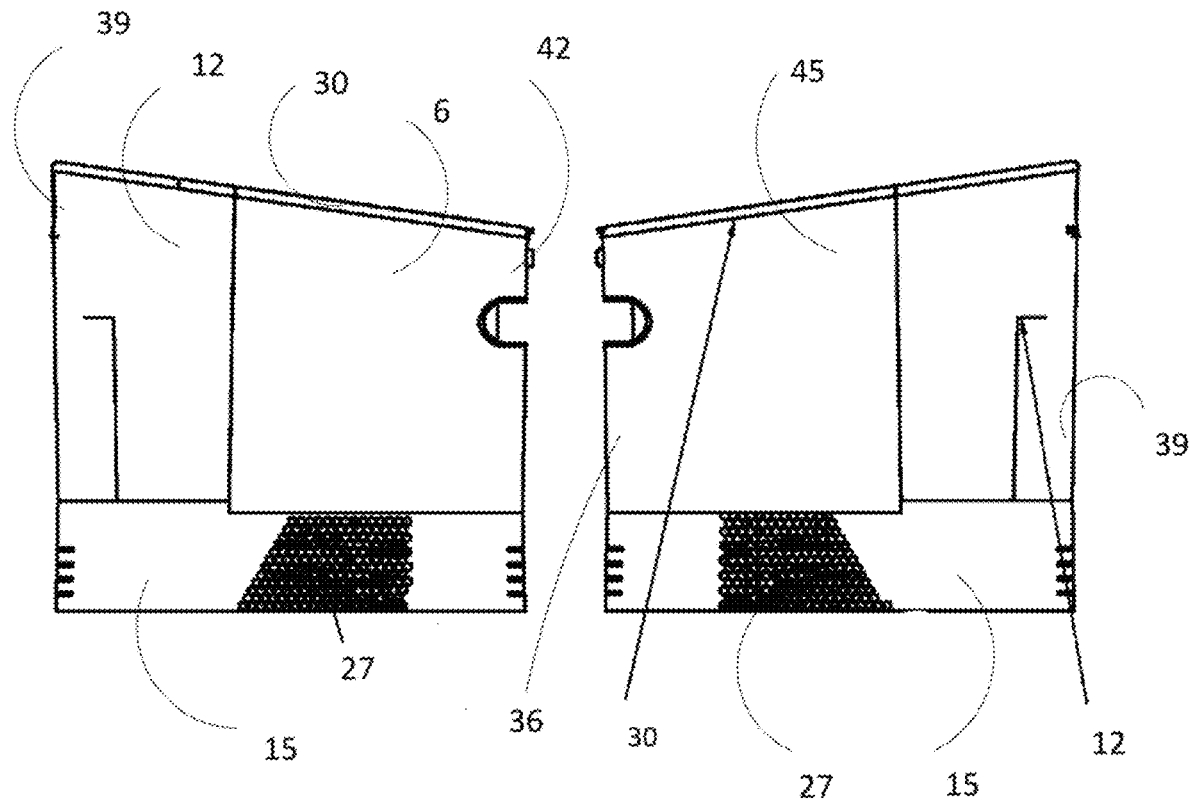
FIG. 4 shows side views of an exemplary apparatus.

Referring now to FIG. 4, side views of an exemplary apparatus are shown. The apparatus with the base, reservoir, and compartment are shown on the left side and on the right side. The air inlet is present at either side. The front side and the rear side are indicated. In preferred embodiments, the compartment and the reservoir are arranged at the front and the rear, respectively, for the purpose of taking up less counterspace while providing ample access to the compartment. However, other configurations, such as side-by-side are also contemplated.

Figure 5:
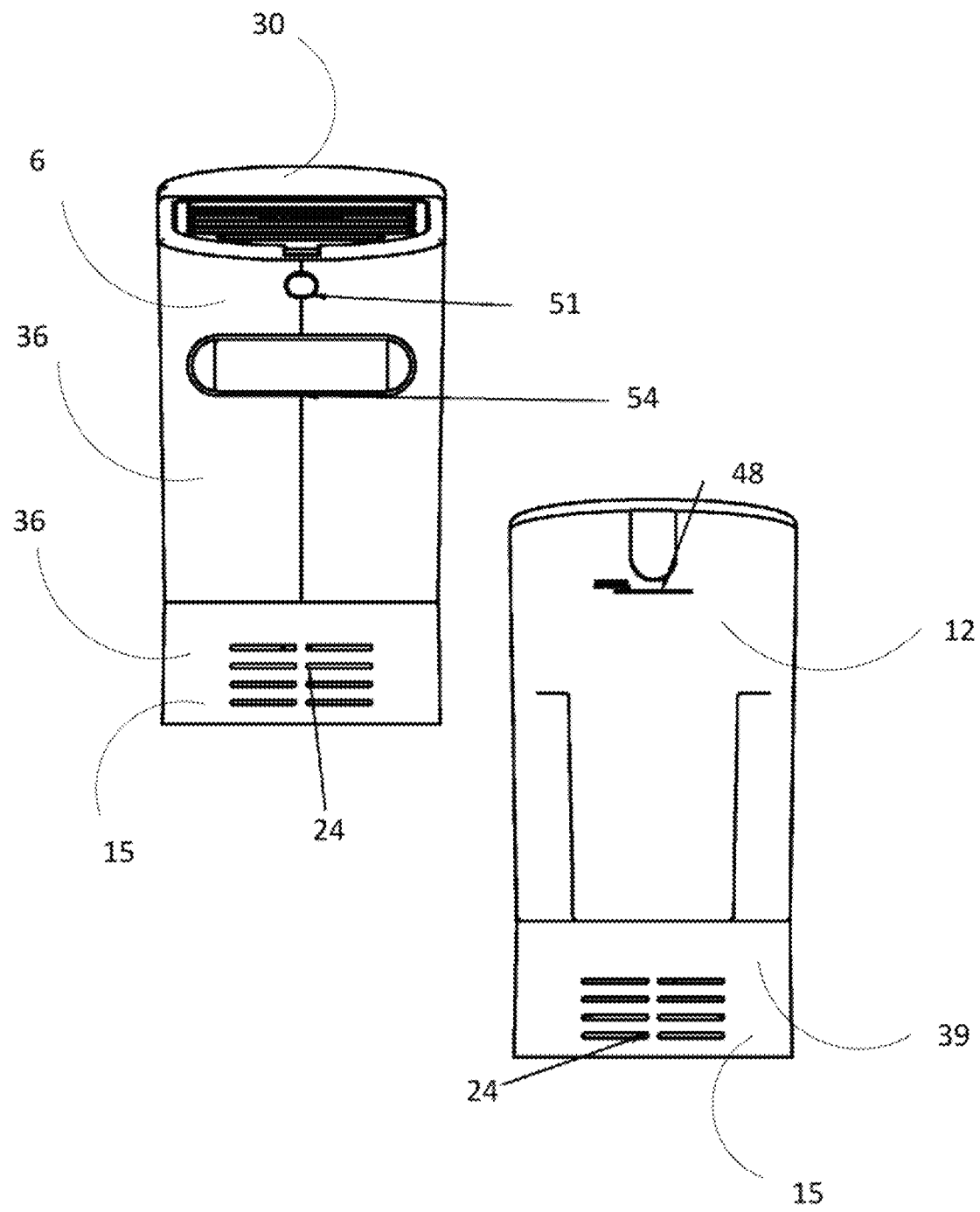
FIG. 5 shows front and rear views of an exemplary apparatus.

Referring now to FIG. 5, front and rear views of an exemplary apparatus are shown. The front and the rear sides of the apparatus are shown with the compartment at the front side and the reservoir at the rear side. A max fill indicator is shown. The front and the rear sides of the base contain an air outlet. The front of the compartment contains a window to view inside the compartment interior space. However, a window may be present in other locations on the compartment. The front of the compartment also displays a compartment release. This release may be a button or a latch. The compartment release allows for removal of the compartment from the base. However, in some embodiments, the reservoir or the compartment, or both, may be fixedly attached to a base. Solenoid valves may be used for air exhaust.

Figure 6:
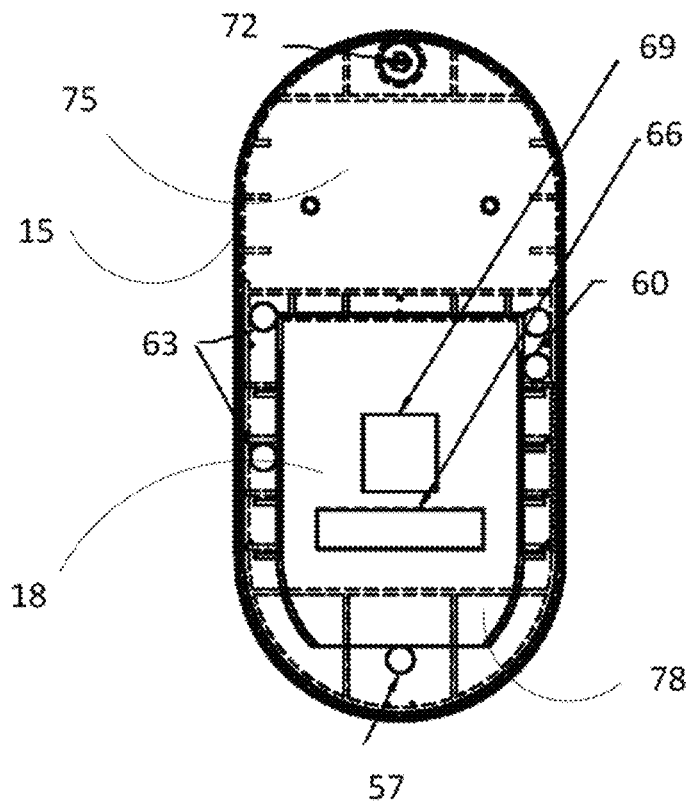
FIG. 6 shows a top-down view of a base.

Referring now to FIG. 6, a top-down view of a base is shown. The base contains the thermoelectric components that are powered by a conventional power source. The base includes a compartment connector, at least one air tube, at least one water tube, a heating element, a cooling element, a heating and cooling element compartment, a reservoir entrance, a reservoir dock, and a compartment dock. The thermoelectric components are conventional. Various heating and cooling elements can be utilized and are not limited. In some embodiments, the base may also include micro processing components for controlling the apparatus functions along with various sensors for liquid fill, time, and temperature.

Figure 7:
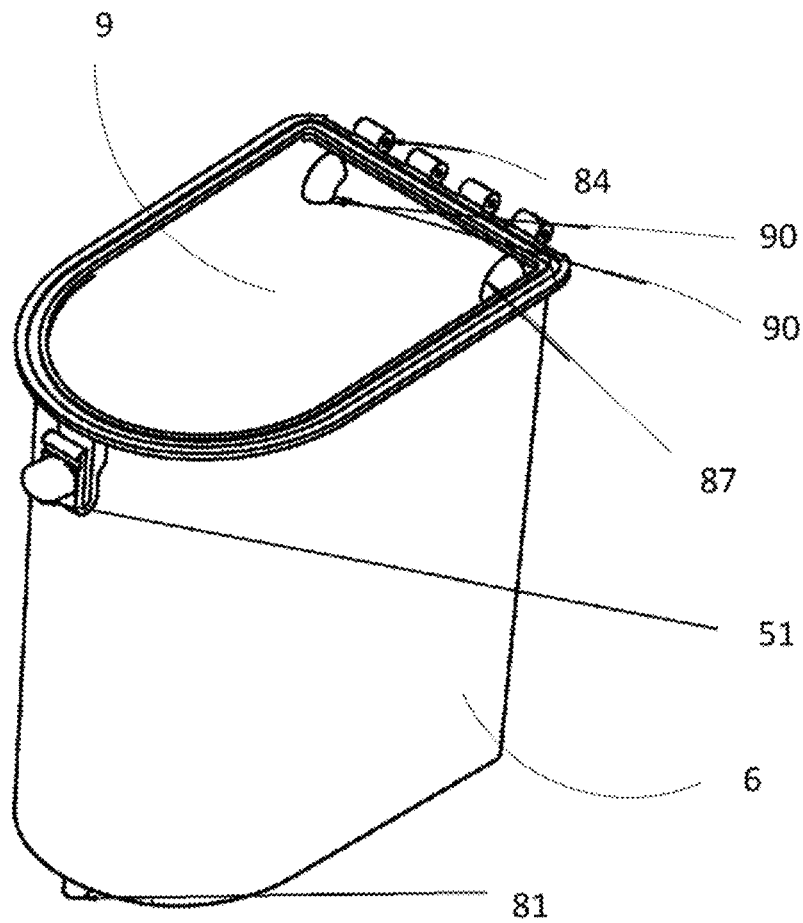
FIG. 7 shows a perspective view of a compartment.

Referring now to FIG. 7, a perspective view of a compartment is shown. The compartment contains a water inlet/outlet, a compartment release, a lid hinge, a temperature sensor, an air inlet/outlet, and a defined compartment interior space. Various valves and pumps may be used in the apparatus to perpetuate and regulate the flow of liquid within a compartment or reservoir or between a compartment and a reservoir. Air pumps may be internal air fans. In some embodiments, a tube network spans between the reservoir and the compartment and passing along the heating or cooling elements housed within the base. The liquid passing through the tube network may be heated or cooled continuously or cyclically. The base components are arranged so that the heating and cooling elements are positioned in the compartment docking space, so the compartment can come in contact with the heating and cooling elements.

Figure 8:
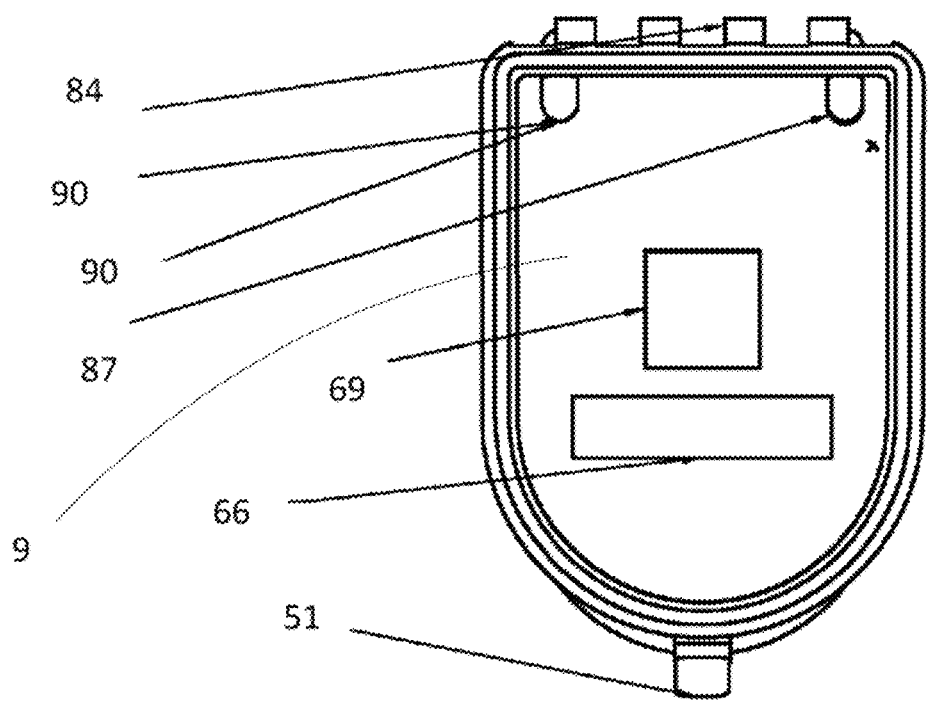
FIG. 8 shows a top-down view of a compartment interior space.

Referring now to FIG. 8, a top-down view of a compartment interior space is shown. The compartment interior space includes the air inlet/outlet, a temperature sensor, and access to a cooling element and a heating element. In some embodiments, the compartment may be constructed out of a conducive material such as a metal to promote faster heating. The heat and cooling access areas for the compartment substantially align with the position of the heating and cooling elements housed in the base.

Figure 9:
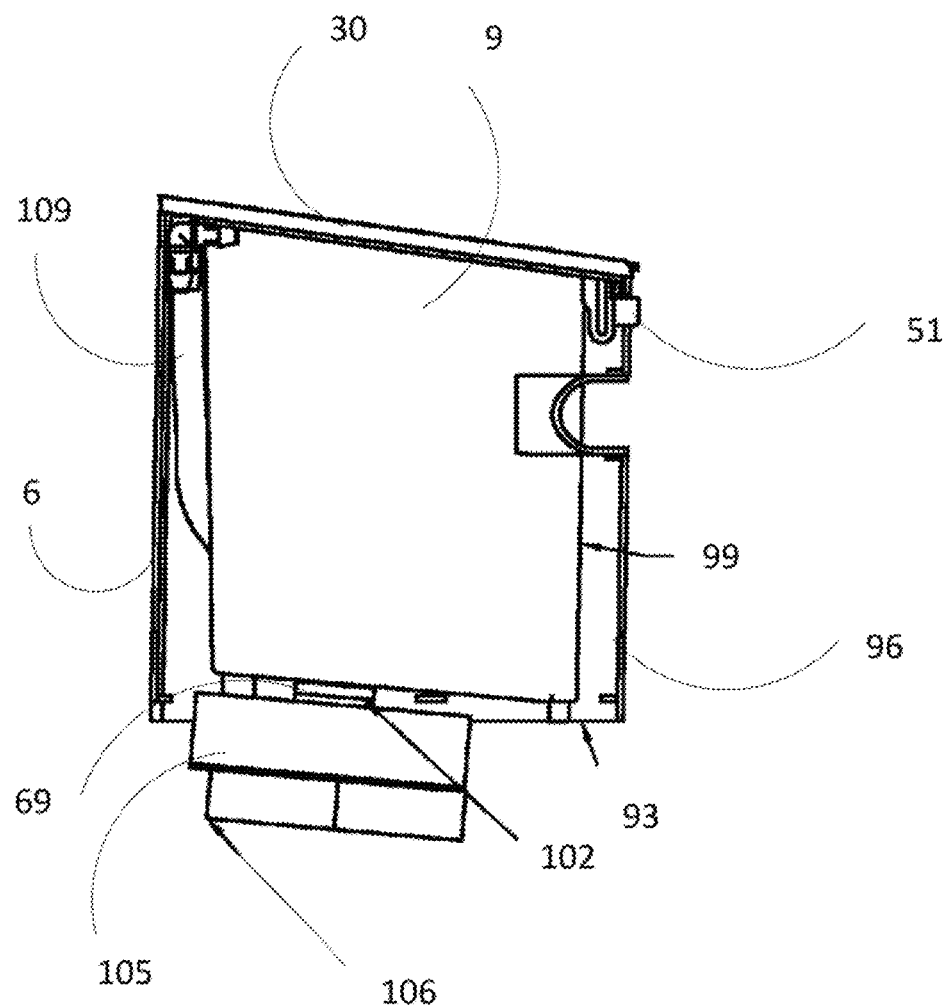
FIG. 9 shows a side view of a compartment with heating and cooling elements.

Referring now to FIG. 9, a side view of a compartment with heating and cooling elements is shown. The compartment and lid are shown along with an insulated structure. The compartment in this exemplary embodiment comprises and inner wall and an outer wall. The space between the inner wall and the outer wall may be filled with a solid, liquid, or a gas such as air. At the bottom, the cooling element along with a spacer and a heat sink are shown. In some embodiments, the heating element and the cooling element are stacked with a spacer. In other embodiments, the heating element and the cooling element may be separate.

Figure 10:
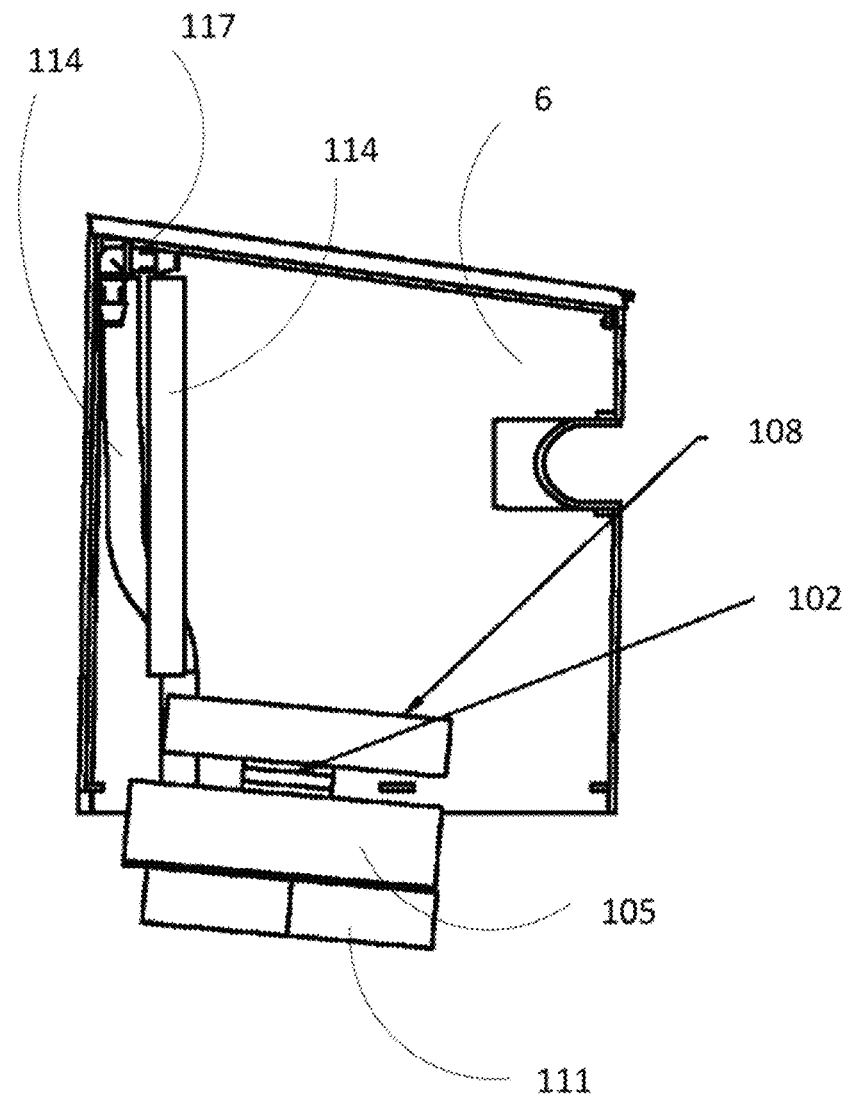
FIG. 10 shows a side view of a compartment with heating and cooling elements.

Referring now to FIG. 10, a side view of a compartment with heating and cooling elements is shown. In an additional view of the compartment, the following are shown: a cold sink, a cooling element such as a peltier, a fan, a heat sink, a water tube network and, a valve. The cooling components work with the tube network to transfer heat to create a cooling or refrigeration effect in the compartment. Cooling can be accomplished before, during, and after cooking. The cooling system will refrigerate the compartment to preserve ingredients before cooking. The cooling system can activate to regulate or vary the cooking temperatures. The cooling system can remove heat after cooking to prevent ingredients from over cooking. Once cooking is finished, a person has the option to activate refrigeration.

Figure 11:
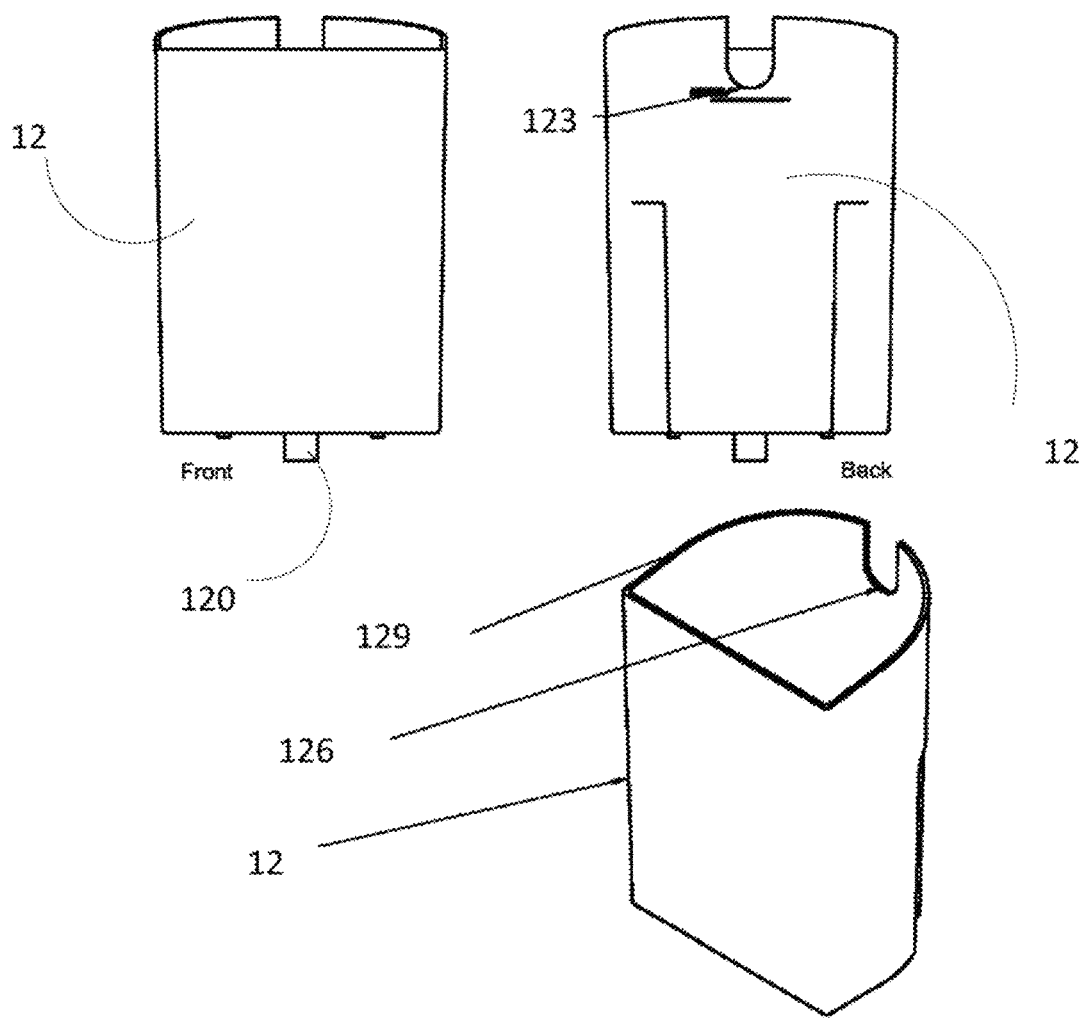
FIG. 11 shows front, rear, and perspective views of a reservoir.

Referring now to FIG. 11, front, rear, and perspective views of a reservoir are shown. The reservoir contains a check valve at the bottom, a rim for accommodating a lid, and a fill line with overflow safety features.

Figure 12:
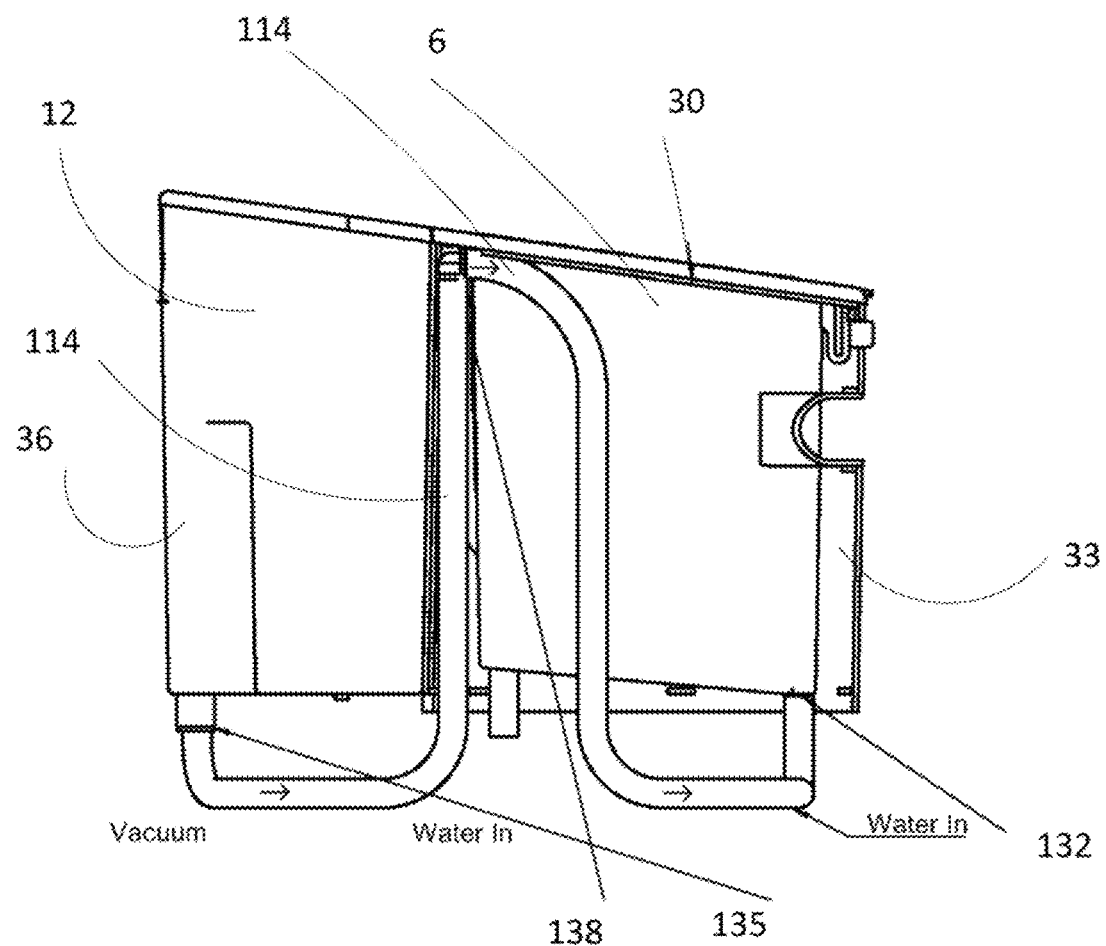
FIG. 12 shows a side view of a reservoir, compartment, and tubes with a vacuum status.

Referring now to FIG. 12, a side view of a reservoir, compartment, and tubes with a vacuum status is shown. This embodiment uses a single air pump configuration. The air pump sucks air from the compartment to create a vacuum and to provide dry cooling. When the vacuum status is initiated by the air pump, water flows from the reservoir through the tube network, and into the compartment. The compartment, reservoir, water tube, front side, rear side, compartment water connector, reservoir water connector, lid, and water level line are shown.

Figure 13:
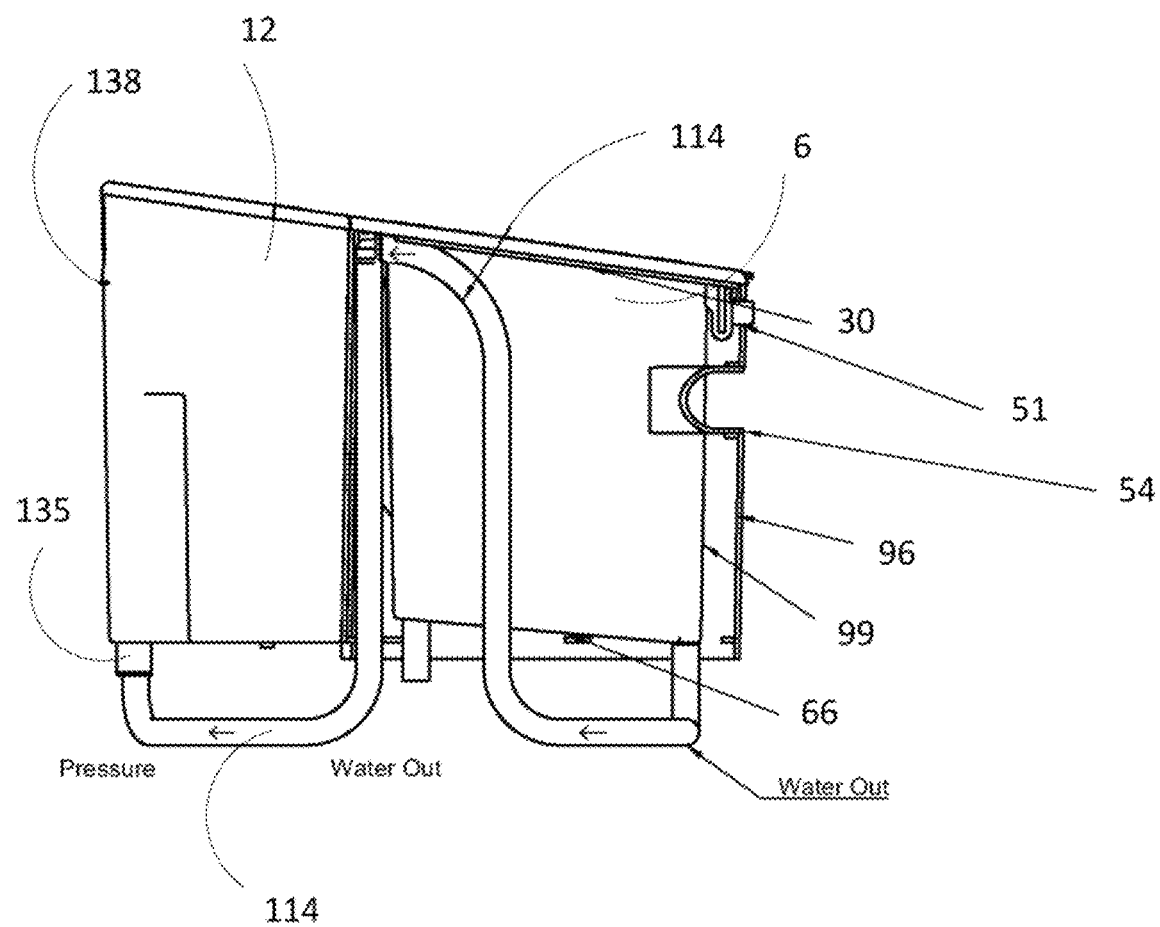
FIG. 13 shows a side view of a reservoir, compartment, and tubes with a pressure status

Referring now to FIG. 13, a side view of a reservoir, compartment, and tubes with a pressure status is shown. This embodiment uses a single air pump configuration. The air pump pushes air into the compartment to pressurize it. When the pressure status is initiated by the air pump, water flows from the compartment through the tube network, and into the reservoir. The compartment, reservoir, water tube, heating element, outer wall, inner wall, window, and compartment release features are also shown.

Figure 14:
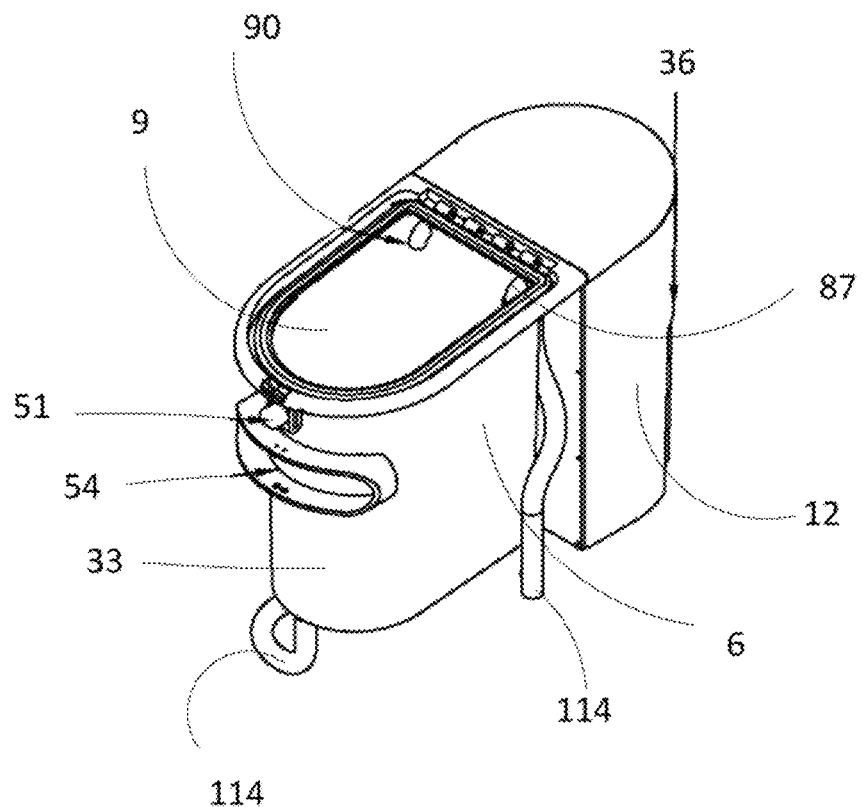
FIG. 14 shows a perspective view of an apparatus with a compartment, reservoir, and air pump.

Referring now to FIG. 14, a perspective view of an apparatus with a compartment, reservoir, and air pump is shown. This exemplary embodiment displays the components in connection with the compartment that regulate heating, cooling, and liquid movement in and out of the compartment. The single air pump serves as a vacuum-pressure module at or near the top of the compartment interior space. The temperature sensor may also be present at the top or near the top of the compartment interior space. The air inlet-outlet and the water tube network are shown. The compartment outer wall is removed for demonstrative purposes. With an insulated compartment, the tube network with inlets and outlets may be present between the inner wall and outer wall.

Figure 15:
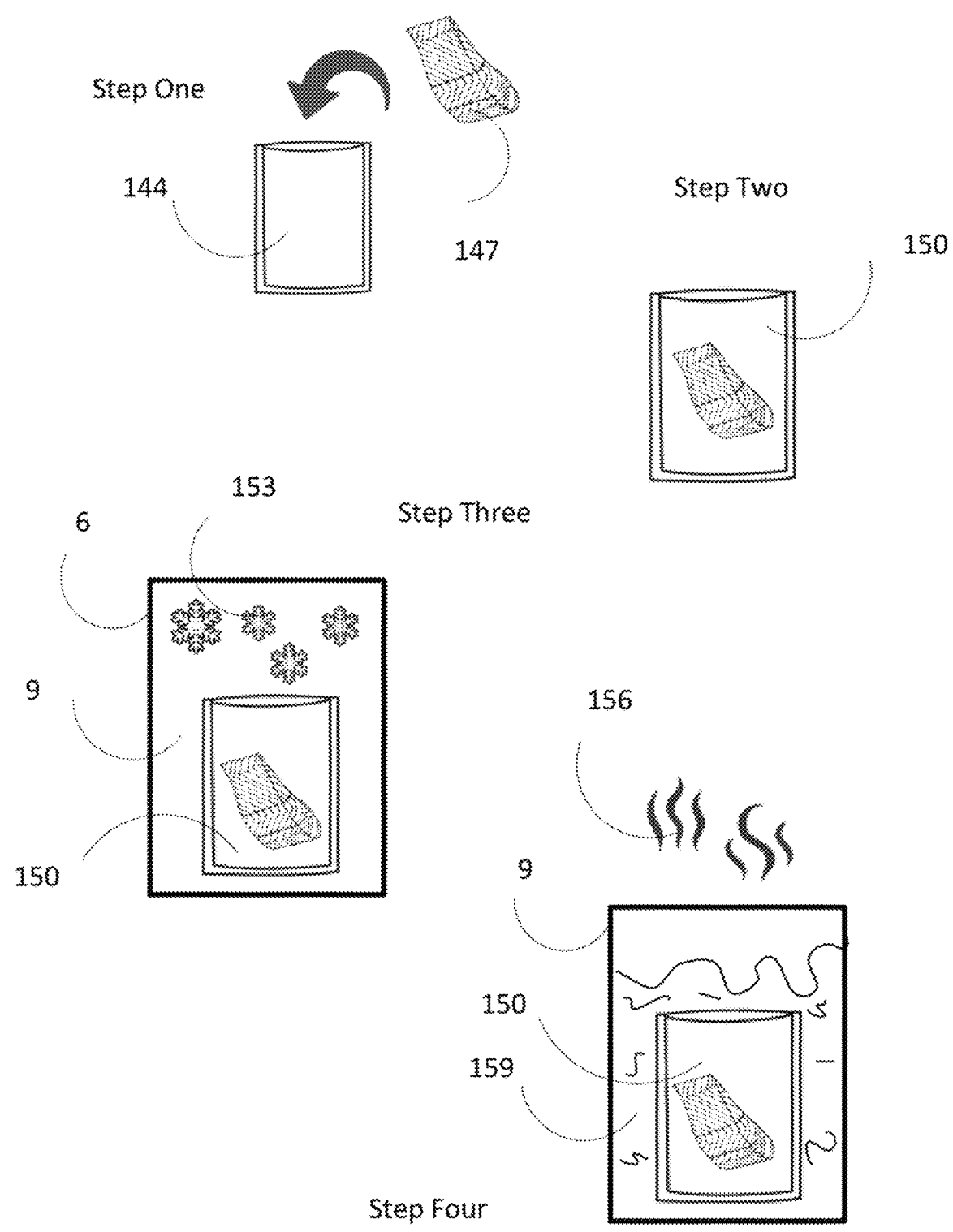
FIG. 15 shows exemplary method steps for performing sous vide cooking with the apparatus.

Referring now to FIG. 15, exemplary method steps for performing sous vide cooking with the apparatus are shown. In preferred method steps, ingredients are placed in a vessel. Next, the vessel is vacuum sealed. This is a key component of sous vide cooking. However, it is important to note that the apparatus may be used to cook ingredients that are not vacuum sealed in a vessel. A vacuum sealed vessel or ingredient is placed inside the compartment in step three. Step three shows the vacuum sealed vessel in the compartment with cooling refrigeration.

Unlike a slow cooker that will heat and cook fool all day, ingredients used in sous vide cooking will easily spoil, overcook, or will not retain flavors or moisture as intended. Therefore, the apparatus allows slow cooker convenience with morning or overnight prep, hand-free activation at a pre-determined time, and accurate sous vide cooking for read-to-eat ingredients at the desired time. The refrigeration step preserves the ingredients until it is time to cook.

Step four is the traditional sous vide cooking step. However, the unique features of the apparatus including the air pump, heating element, and tube network work to till the compartment with liquid, heat the liquid, and consequently heat the ingredients.

Additional steps include draining the compartment and initiating another round of refrigeration. Furthermore, the apparatus may be used without a first refrigeration step.

Referring now to FIG. 16A, an exemplary apparatus in a built-in setting is shown. An exemplary apparatus may be built in with a cabinet and a countertop or other solid surface. The apparatus may be connected with a wire to a power source. In addition, the apparatus may have a direct connection to a water source via a water line. The water line supplies the reservoir with water directly from the plumbing. In embodiments where the apparatus has a pumpless switch system or configuration, a water drain valve provides direct input from an external water line into the compartment, bypassing the need for a separate reservoir. The external water line may also serve as a drain line.

Referring now to FIG. 16B, an exemplary apparatus is shown with wireless control capabilities and a vacuum outlet module. The apparatus is operated by a pre-programmed microcontroller having an integrated timer and a display unit which may be wirelessly connected to a network. The system contains operably configurable software with commands executed by the hardware architecture to control the apparatus.

The display unit or control panel further enables to manually input a pre-determined cook time. During use, the microcontroller transmits an output signal to an electrically connected solenoid which activated the heating element or refrigeration/cooling system. The microprocessor and integrated memory module are configured to store a plurality of input commands including cooking and cooling logic which may be viewed at the display unit. The microprocessor may be further programmed to include pre-programmed cook times or track the most popular food items used by the behavior. Further, the microprocessor may provide alerts to the user when cook time milestone are reached.

In one example, a person can prepare ingredients for sous vide cooking by placing the ingredients in a vessel and vacuum sealing the vessel. The person places the vacuum sealed vessel inside the compartment interior space, closes and secures the lid, and either uses the control panel or a smart device with a coordinating software application over a wireless network to set the time, temperature, and other parameters for cooking. The apparatus will refrigerate the compartment interior space to preserve the ingredients in the vessel until the designated time to cook is reached.

At that point, the control panel will compute instructions to initiate compartment filling with liquid, heating to a designated temperature, and cooking the ingredients in the vessel for a pre-determined time according to the type of ingredient and level of cooking. The ingredients will be cooked as desired by the time the person returns to the apparatus to retrieve the ingredients.

Figure 17A:
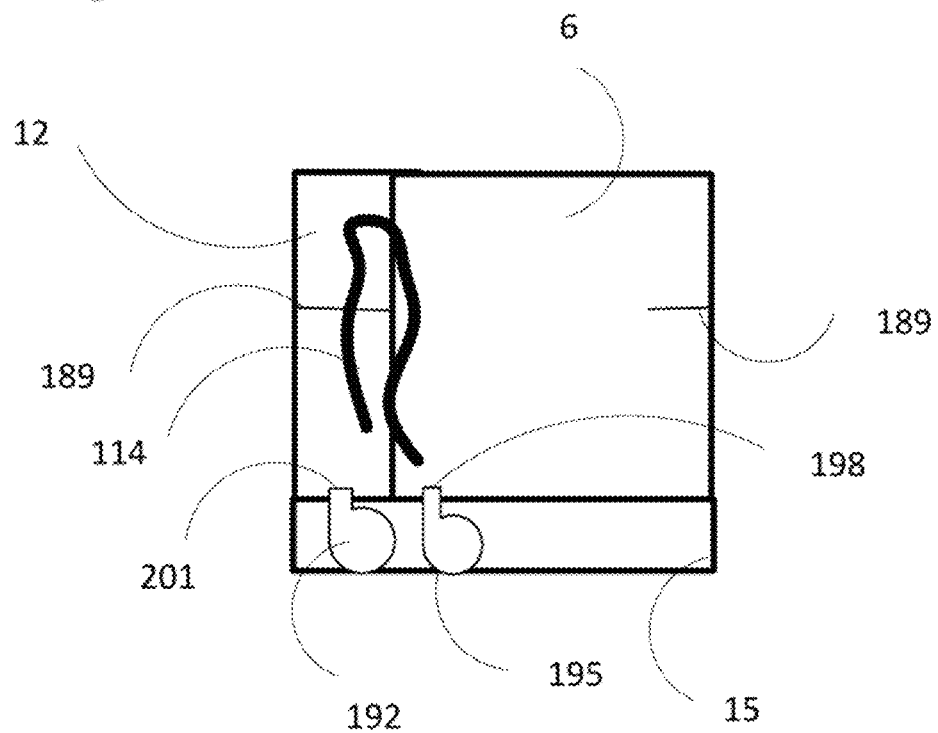
FIG. 17A shows an exemplary apparatus having a water pump configuration.

Referring now to FIG. 17A, an exemplary alternative apparatus having a dual water pump system is shown. In this alternative embodiment, the compartment and the reservoir have their respective water line indicators and their respective water pumps with outlets. A water pump water pressure switch system can be implemented. Rather than using air vacuum and pressure to move water though a tube network, a water pump will pump water via a water tube between the reservoir and the compartment. The water pump pushes the liquid over the water line to move the liquid.

Figure 17B:
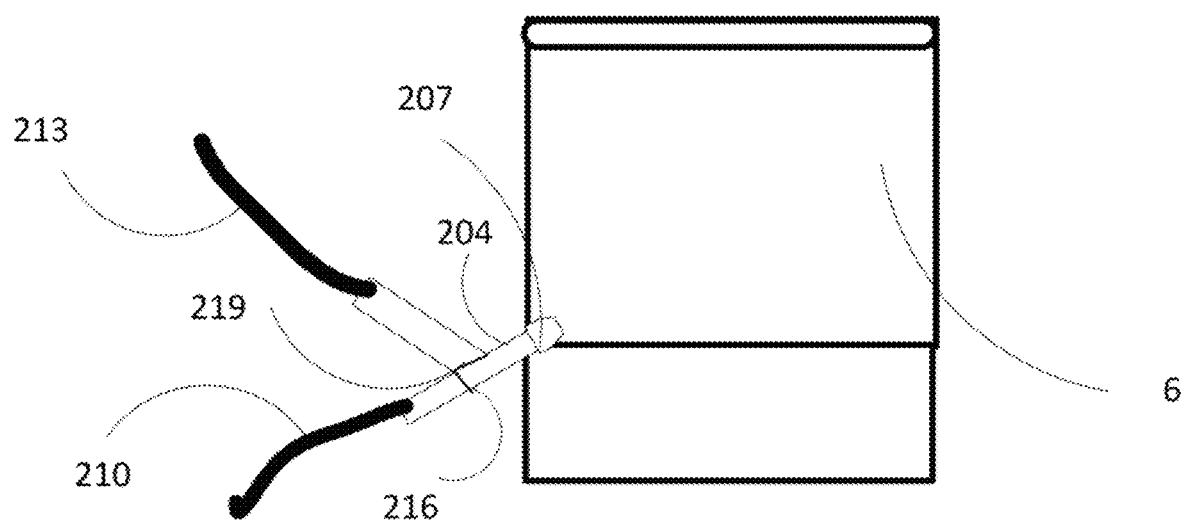
FIG. 17B shows an exemplary apparatus having a pumpless switch configuration.

Referring now to FIG. 17B, an exemplary alternative apparatus having a pump-less switch system and without a reservoir is shown. In this particular configuration, the apparatus has a single chamber, a compartment. The bottom of the compartment has a drain with a drain switch. The drain switch can be connected to electronic and microprocessor components or may be manually operated to activate the switch to open or close the drain. When the switches are not activated, the switches block the flow of liquid, plugging the system. When the switches are activated, liquid can flow through the drain or valve.

The drain with drain switch is connected to a Y valve. An external water input is connected to one valve end. An external water drain line output is connected to the other valve end. Gravity will draw the water in the compartment through the drain switch, through the valve, through the outlet switch, and out the drain line. Pressure and flow properties from the external water line will push the liquid through the inlet switch, through the Y valve, through the drain with drain switch, and into the compartment.

CONCLUSION

A number of embodiments of the present disclosure have been described. While this specification contains many specific implementation details, they should not be construed as limitations on the scope of any disclosures or of what may be claimed. Rather the specification presents descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. Various modifications may be made without departing from the spirit and scope of the claimed disclosure.

What is claimed is:

1. A method of cooking ingredients with a sous vide method in a food storage and preparation apparatus for dry cooling and sous vide cooking in a single compartment, wherein the food storage and preparation apparatus contains only one single compartment having a single volume, the method steps comprising:
   obtaining ingredients,
   placing ingredients in a vessel,
   placing the vessel inside the single compartment of the food storage and preparation apparatus,
   closing a single compartment lid,
   selecting desired cooking parameters,
   initiating a cooling element,
   inducing refrigeration inside a single compartment interior space,
   extinguishing the cooling element,
   initiating an air pump to induce a vacuum inside the single compartment interior space to draw liquid from a reservoir, through a tube network, and into the single compartment,
   and initiating a heating element to heat the liquid inside the single compartment.

2. The method steps of claim 1, further comprising connecting a smart device to an electronic control panel of the food storage and preparation apparatus via a wireless connection to control and set cooking parameters.

* * * * *